(12) United States Patent
Brickl et al.

(10) Patent No.: US 8,297,477 B2
(45) Date of Patent: Oct. 30, 2012

(54) DOSING DEVICE FOR MEDICAMENTS

(75) Inventors: Rolf-Stefan Brickl, Warthausen (DE);
Jürgen Schraivogel,
Ummendorf/Fischbach (DE)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 840 days.

(21) Appl. No.: 11/721,002

(22) PCT Filed: Dec. 31, 2005

(86) PCT No.: PCT/EP2005/014155
§ 371 (c)(1),
(2), (4) Date: Mar. 20, 2008

(87) PCT Pub. No.: WO2006/072460
PCT Pub. Date: Jul. 13, 2006

(65) Prior Publication Data
US 2010/0044398 A1   Feb. 25, 2010

(30) Foreign Application Priority Data

Jan. 7, 2005   (DE) .......................... 10 2005 001 001

(51) Int. Cl.
*B65D 88/54* (2006.01)
(52) U.S. Cl. .......... 222/308; 222/48; 222/139; 222/287; 222/302; 222/368; 221/207
(58) Field of Classification Search .......... 221/206–207; 414/216, 328; 222/282, 287, 293–295, 297, 222/302, 315, 367–368, 23, 41, 47–48, 139, 222/305–308, 192
See application file for complete search history.

(56) References Cited

U.S. PATENT DOCUMENTS

| 2,352,809 A | | 7/1944 | Stauss | |
| 2,761,589 A | * | 9/1956 | Stach | 222/624 |
| 3,101,853 A | * | 8/1963 | Long et al. | 251/174 |
| 4,013,199 A | * | 3/1977 | Brown | 222/438 |

(Continued)

FOREIGN PATENT DOCUMENTS

DE   807722 C   7/1951

(Continued)

OTHER PUBLICATIONS

International Search report of international Application PCT/EP2005/014155.

(Continued)

*Primary Examiner* — Kevin P Shaver
*Assistant Examiner* — Andrew P Bainbridge
(74) *Attorney, Agent, or Firm* — Michael P. Morris; Mary-Ellen M. Devlin

(57) ABSTRACT

A dosing device for dispensing small-particulate pharmaceutical preparations has at least one chamber for receiving a larger amount of the preparation and a dosing unit. A rotary valve has at least one dosing chamber for receiving a defined dose of the preparation. The dosing chamber is moveable between a filling position and a dispensing position. The rotary valve rotates about a substantially horizontal axis, and has an adjustment device for setting the volume in the dosing chamber and a twisting device. The twisting device constitutes the actuator for the adjustment device. The device is made of a plastic material carefully selected to assure that no softening agents or other volatile components will be released, which prevents drug contamination.

29 Claims, 9 Drawing Sheets

U.S. PATENT DOCUMENTS 6,293,440 B1 * 9/2001 Weaver .................... 222/368
6,779,480 B2 * 8/2004 Zamjahn .................. 116/308

FOREIGN PATENT DOCUMENTS

| FR | 2030308 A | 11/1970 |
|---|---|---|
| GB | 1456787 A | 11/1976 |
| GB | 2067165 A | 7/1981 |

OTHER PUBLICATIONS

International Written Opinion of international Application PCT/EP2005/014155.

* cited by examiner

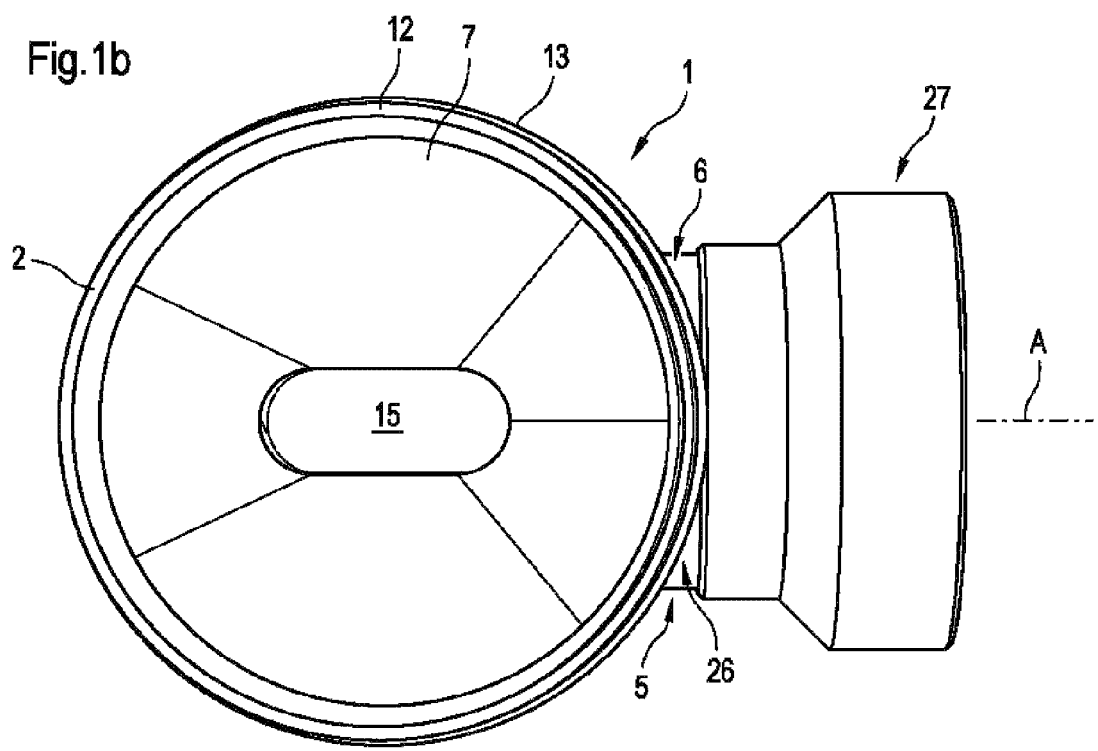
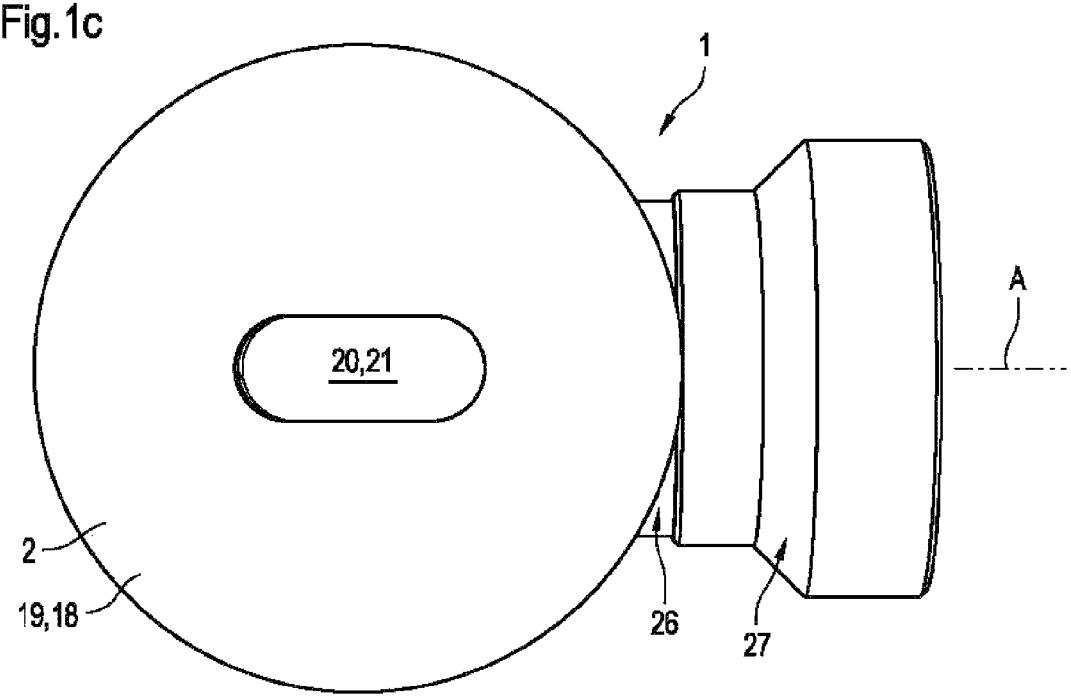

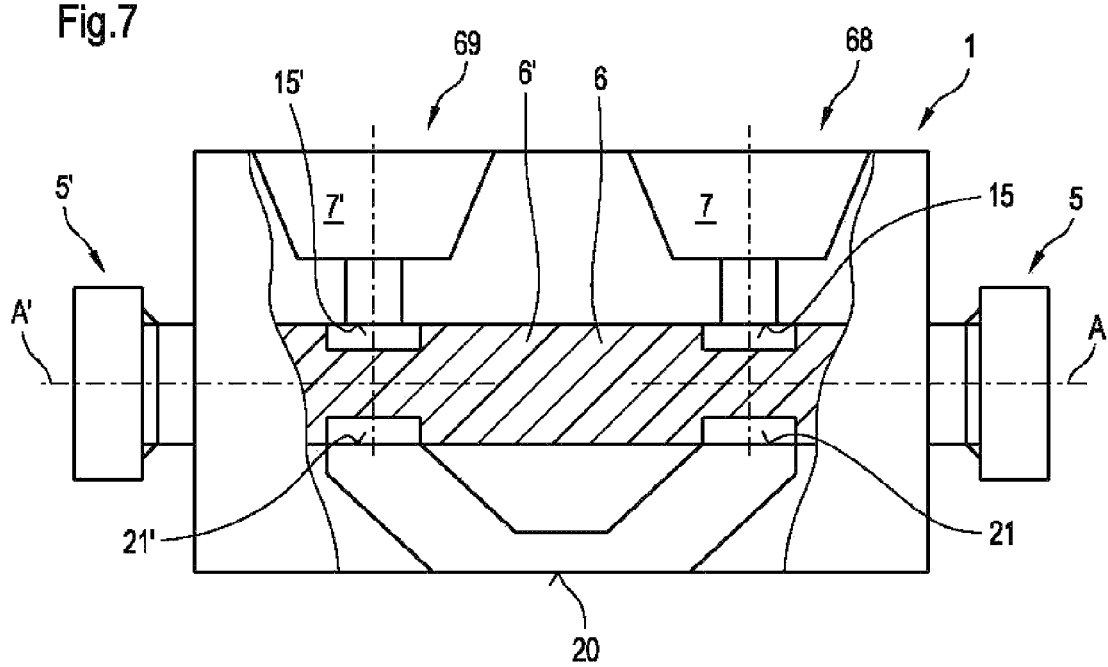

DOSING DEVICE FOR MEDICAMENTS

BACKGROUND

The invention relates to a dosing device, especially for small-particulate pharmaceutical preparations, preparations in the form of pellets, granulates or extrudates, especially a drug dosing device, particularly with the features in the preamble of Claim 1, and furthermore, the use of a dosing device.

When compared with single-unit forms, e.g., tablets, small-particulate administration forms of pharmaceutical preparations, e.g., pellets, granulates or extrudates, exhibits advantages such as the small-particulate preparations providing a more even distribution in the intestinal tract, which is especially important for extended-release forms, and being easier to swallow, when administered as separate particles. Moreover, a single form of administration may cover a wider dosage range, whereby different amounts are filled into corresponding capsules and administered.

Usually, such small-particulate pharmaceutical preparations are filled into hard gelatin capsules, although these have a number of disadvantages when compared with the bulk product, i.e., small-particulate pharmaceutical preparations. Thus, the proportion of water of hard gelatin capsules must be greater or equal to 10 percent, otherwise, the hard gelatin capsules may embrittle and even break, while already in the packaging means or when removed therefrom. This may give rise to substantial packaging means problems for preparations sensitive to moisture, which often results in short shelf lives.

Since the relationship between the amount of preparation and the capsule shell varies for different doses, a separate extensive packaging means test must be performed for each dose.

Combining several small-particulate preparations is only possible to a certain extent, since the different dosages, i.e., the mix ratio between the individual preparations, is already predetermined. A conventional way of combining two active ingredients, whose individual components are present in two or three dosages, may require as much as six fixed drug combinations.

Prior art describes how to measure out with the aid of dosing devices a substantial amount of a small granular pharmaceutical preparation into a predetermined portion, which may then be given to a patient.

Thus, U.S. Pat. No. 4,805,811 and European patent EP-0 787 979 A1 each disclose a generic dosing device with a chamber for receiving a substantial amount of a small-granulate pharmaceutical preparation. A rotary valve incorporating several dosing chambers with preset volumes is provided on this dosing device. By turning the dosing valve about a vertically oriented axis, a partial amount of the preparation contained in the chamber is successively filled into one of the dosing chambers and re-emptied. The exit opening of the chambers filled with the preparation to be dosed and the ejection opening for the dosed preparation are arranged offset in axial direction relative to one another. Different dosages are obtained, whereby a corresponding number of partial amounts are removed from the chamber with the aid of the rotary valve.

These known dosing devices are especially designed to enable older persons and children or persons having difficulty swallowing larger tablets to measure out and ingest dosed amounts of small-particulate preparations that are easily swallowed.

European patent EP-0 217 390 A2, and French patents FR-2 380 536 and FR-2 380 537, each describe a dosing device provided with a chamber filled with a small-particulate pharmaceutical preparation allowing the removal of a defined, constant partial amount (dose) of the preparation from the chamber with the aid of a dosing chamber or dosing spiral formed on the valve.

Moreover, U.S. Pat. No. 4,273,254, British patent GB 1 316 174, U.S. Pat. No. 4,237,884, world patent WO 95/25050, or U.S. Pat. No. 5,255,786 describe so-called tablet separators, whereby several tablets are received in a chamber, from where they may be removed separately from the chamber, e.g., with the aid of a valve disk.

British patent GB 1 511 107 describes a measuring and dosing device for dosing granular alloys or metal, whereby the volume of a dosing chamber may be adjustable corresponding to a defined partial amount. For this purpose, a piston in a dosing valve is moveable and adjustable in preset positions by means of a wedge-shaped cam. Similar dosing devices are known from British patents GB 215 577 and GB 139 342.

Prior-art dosing devices are intended to dose the most varied preparations for all kinds of purposes. The design and configuration of the dosing device is subject to the consistency and properties of the preparation to be dosed. The described embodiments are thus characterized by a complex design, and sometimes complicated handling. Moreover, some of the devices are built very large due to the large distances that are inherently required between the feed opening from the chamber filled with the preparation to be dosed and the discharge opening for the dosed preparation, thus complicating handling precisely for the manual dosing of pharmaceutical preparations. This also applies to the structural implementation of different options that are sometimes provided for changing the volume of the dosing chamber and its motion between the filling and emptying position. For this purpose, regulating devices that are operated independently of one another are provided in order to adjust the dosage volume and the motion of the dosing chamber, whereby subsequent steps for resetting the dosing chamber are required, which steps are characterized by additional components and additionally required installation space. Automatic resetting is especially realized through operation against a pretension, for which corresponding means are again provided.

SUMMARY OF THE INVENTION

Based on this prior art, the object of the invention is to indicate a dosing device or a dosage method, preferably a self-dosage method, for small-particulate pharmaceutical preparations enabling patient-oriented, individual and continuously variable adjustable precise dosing of a small-particulate pharmaceutical preparation(s), whereby the dosing device should be characterized by a compact design and simple handling.

A dosing device for dosing small-particulate pharmaceutical preparations, which is characterized by an extension in vertical and longitudinal direction, comprises at least one chamber for receiving a larger amount of the preparation and a dosing unit, comprising a rotary exhibiting at least one dosing chamber for receiving a defined partial amount of the preparation, whereby the dosing chamber is movable between a filling position, in which it is to be filled with preparation from the chamber, and a dispensing position, in which the preparation from the dosing chamber is to be dispensed from the dosing device. The dosing chamber is rotably mounted about an axis of rotation at least between the filling and emptying positions, and exhibits an inlet opening for the preparation to be dosed, which in the filling position aligns with a first feed opening that is at least indirectly coupled with or forming the chamber, and a dispensing opening for the dosed preparation, which in the dispensing position aligns with a further second feed opening at least indirectly connected to or forming a dispensing opening from the dosing device. The feed openings are arranged offset relative to one another in the direction of height of the dosing device. According to the invention, the axis of rotation is arranged in direction of height between both feed openings and extends parallel or inclined to the longitudinal direction of at least one of the feed openings, i.e., at an angle to the direction of height. The volume of the dosing chamber for specifying the defined partial amount of the preparation to be dispensed from the dosing device is adjustable. In the intermediate positions between the filling and emptying positions, the rotary valve acts as a locking device between both feed openings, i.e., when twisting from the filling to the emptying position, direct passage of the preparation between the feed openings of the chamber to the dispensing opening of the dosing device is avoided. This makes it possible a) to perform exact dosing of the preparation by means of the dosing chamber itself, and not as previously customary, through multiple filling and emptying of a relatively small dosing chamber, as was previously customary, and b) to keep the sliding paths of the dosing chamber corresponding to at least a circular arc segment very short, which also applies analogously the arrangement of the feed openings and their distances to one another, whereby the dosing device may be kept very compact. Moreover, the arrangement between the feed openings and the substantially horizontal orientation of the axis of rotation enables simple guidance of adjustment devices in order to change the volume in the dosing chamber, independent of the position of the chamber. They (the adjustment devices) be designed to be easily accessible.

The ability to adjust the dosing chamber makes it possible to perform patient-oriented individual adjustment of doses, for example when dosing the preparation in relation to body weight, or adjusting the dose according to diurnal needs. Furthermore the preparation dose may be adjusted individually over a longer intake period, so that, e.g., preparations that need to taken in larger doses in an early stage may be selectively reduced over the intake period. Likewise, patients may gradually increase initial low doses to the therapeutically required dose in order to improve tolerance. This dosing flexibility is especially advantageous when dosing children, since due to the unequal body weights of just a few kilograms to about 70 kilograms requires a plurality of dose strengths. Suitable embodiments of the dosing device according to the invention make it possible to dose pharmaceutical preparations, e.g., in the range of 40-800 mg or 0.4-8 g, preferably 50-750 mg, or 0.5-7.5 g.

Further advantages of the invention follows from the below specification, dependent claims and figures.

Preferably, the axis of rotation is arranged perpendicular to the direction of height, i.e., oriented in the longitudinal direction or extending in a horizontal plane. The direction of height as viewed in the upright position of the dosing device thus describes the vertical direction. This arrangement enables especially easy handling of such a dosing device, since the upright position also corresponds to the operating position that is usually employed. Generally, direction of height refers to the extension of the dosing device in the vertical direction and longitudinal direction to the extension in axial direction, especially in the corresponding axial section plane.

The rotary valve extends in the base frame of the dosing device in longitudinal direction and is preferably secured against displacement in axial direction and rotably mounted in circumferential direction at least when acted upon by a force. Thus, the base frame, depending on its design as either a one-part or multipart unit, exhibits a guide channel open at least to one side in order to ensure the mounting, preferably, however, in the form of a passage opening (or: slot, port) or a channel extending over the whole extension, which at least in the area of the installation position of the dosing chamber to be accommodated is characterized by circular cross-sections. The geometry of the passage opening in the area of the extension of the dosing chamber in longitudinal direction thereby matches the cross-sectional shape of the dosing chamber along its extension in longitudinal direction, preferably by forming a gap seal between the feed openings in circumferential direction. This ensures that when twisting the rotary valve and thereby the dosing chamber, no unwanted dosage preparation will escape the dosing chamber.

Axial securing occurs through corresponding catches for the rotary valve and/or the elements coupled thereto in the guide channel or the base frame forming the guide channel, and/or corresponding means with form-fitting or frictional action, e.g., clamp, snap, latch or bayonet connections.

Concerning the arrangement of the axis of rotation relative to the feed openings viewed in longitudinal direction and the orientation of the axis of rotation relative to the direction of height, there are substantially two options:
 a) The axis of rotation is arranged parallel to the longitudinal axis of the first and second feed openings;
 b) The axis of rotation is arranged inclined to the longitudinal axis of the first and second feed openings.

In case a), the dosing chamber is characterized by a constant cross-section, when viewed in longitudinal direction of the axis of rotation along its extension in longitudinal direction, i.e., along its extension parallel to the axis of rotation. For embodiments according to b), the dosing chamber is characterized by a change of the cross-section in longitudinal direction of the axis of rotation along its extension in longitudinal direction, which change occurs continuously. The design of the dosing chambers determines the required adjustment device, which in case b) may only be realized by the slide-in elements insertable into the dosing chamber in order to avoid abrupt steps in the dosing chamber walls, so as to avoid an unwanted escape of the dosed preparation between the filling and emptying positions, and to ensure a gap seal between the dosing chamber and the environment in the intermediate positions between the filling and emptying positions. The walls defining the dosing chamber are preferably fixed in Design b). When designing the dosing chamber with a constant cross-section in the longitudinal direction, a change of volume may occur either through the displacement of a wall area forming the dosing chamber, or through movable slide-in elements, e.g., wedge elements.

The axis of rotation may thereby be arranged horizontal, i.e., perpendicular to the direction of height, or inclined relative to the horizontal plane. Orientation in the vertical direction, i.e., the direction of height in the upright position of the dosing device is excluded.

Concerning the arrangement of the first and second feed openings relative to one another, a plurality of options likewise exist. These are arranged offset to one another at least in an angle range of 20° through 220°, preferably 90° through 200°. The arrangement follows after connection to the chamber and the dispensing opening from the dosing device, which is likewise included in the base frame. According to an especially advantageous embodiment, the first and second feed openings are arranged offset relative to one another at an angle of 180° and in a vertical plane, free from any offset in the axial direction, which means that both are arranged on top of each other. The dosing process, including dispensing of the preparation, is then characterized by a half turn of the rotary valve about the axis of rotation. In order to perform cartridge-like dosing, i.e., being able to dose at successive identical angle-of-twist distances, at least two dosing chambers offset relative to one another by 180°, i.e., arranged symmetrically relative to the axis of rotation, are preferably provided according to an especially advantageous design, when the feed openings are arranged offset by 180°. Twisting the first dosing chamber from the filling to the emptying position causes simultaneous twisting of the second dosing chamber, from the emptying to the filling position. This design allows the formation of an especially compact dosing device in longitudinal direction, also because all attachment holes or channels at the feed openings are extending or may be oriented in the direction of height. Moreover, twisting by 180° is done by the user in an easily manageable and tactile way. By providing two further dosing chambers with a 90° offset relative to the existing dosing chambers, the angle of twist may be shortened by half. It is also possible to dispense with adaptation mechanisms for resetting the dosing chamber, due to the constantly readvancing dosing chambers.

Preferably, when a plurality of dosing chambers are provided, these are each arranged in pairs and symmetrically in relation to the axis of rotation, whereby the angle between two dosing chambers arranged next to one another in circumferential direction is always constant and corresponding to the angle of twist between the filling and emptying positions. Due to the corresponding arrangement of the feed openings, the angle of twist is thereby chosen such, that when it is multiplied with the number of dosing chambers, the result is 360°. In this case, each twisting motion of a dosing chamber, from a filling to an emptying position, causes twisting of a further dosing chamber, from a non-active position and into the filling position. Such embodiments are especially suited for cartridge-like dosing and dispensing of the dosed preparation, which is characterized by short dosing times and the quick succession of dispensed dosed amounts.

Under a further aspect of the invention, the volume of the dosing chamber is preferably steplessly (smoothly) adjustable. Thus, suitability for different preparations, dosage amounts and a wide range of application is given.

In order to ensure the individual functions of dosing and dispensing the dosed preparation, the dosing unit comprises an adjustment device for setting the volume of the dosing chamber, comprising at least one slidably mounted adjusting element for changing the volume of the dosing chamber, which element is movable back and forth through an adjustment drive parallel to the axis of rotation and a twisting device for moving the dosing chamber between the filling and dispensing positions. Thus, the adjusting element forms either an axially slidable wall of the dosing chamber, an insertion element to be inserted into the dosing chamber in order to reduce the volume, or is connected with these elements, and at least forming a structural unit.

The adjustment device may be designed in a multiform way. Decisive is that a random set point in the form of a random size preset by the user characterizing the required dosage amount at least indirectly, e.g., a preset angle, a displacement path or a rotational motion is converted into a corresponding translatory motion of the adjusting element. Preferably, a spindle drive is used as an adjustment device, whose drive in the form of a cylindrical adjustment drive, especially an adjustment wheel, is twisted at an angle corresponding to the desired change of volume, and this rotational motion is converted into a translatory motion at the adjusting element. The adjustment drive in the form of the adjustment wheel is thereby arranged coaxially to the axis of rotation and designed as a shell-like element, which encompasses the rotary valve in circumferential direction and at least partially in axial direction. The adjustment wheel is preferably fixed in axial direction, in the simplest situation, by a catch at the base frame, especially at the passage opening for the rotary valve and/or the rotary valve itself. For the function of setting the volume change, the adjustment wheel is without a torque-proof connection with the rotary valve. The adjustment wheel, however, is connected through a form-fitting and/or frictional connection with the adjusting element. When designing the adjustment device as a spindle drive, the coupling occurs through a corresponding thread, preferably an acme thread, which is arranged either at a sub-area of the adjustment wheel and adjusting element forming an internal circumference or an external circumference, respectively. With respect to an especially compact and simply mountable construction, the corresponding pickup elements are provided on the internal circumference of the adjustment drive and on the external circumference of the adjusting element. For a design with a thread and several adjusting elements operating in different dosing chambers, the thread pitch should be taken into consideration, when arranging the pickup elements in the form of thread areas on the adjusting elements. This means that adjusting elements arranged adjacent to one another in the circumferential direction and with the same basic geometry and basic position relative to the respective dosing chamber in the longitudinal direction differ with regard to the arrangement of the pickup elements. These are arranged offset in the axial direction about the pitch portion of the thread corresponding to the angle between both dosing chambers. Otherwise, for identically designed adjusting elements, they would have to be installed in different positions, although this would result in a diminution of the area of volume change that is actually of utility for all dosing chambers. Therefore, in order to ensure simultaneous adjustment of all dosing chambers, the first mentioned option is preferably chosen.

In order to perform dosing, it is proposed for an especially preferred embodiment of the dosing device according to the invention to provide a piston on the dosing element, which piston is slidably mounted on the dosing element and whose piston head for changing the volume of the dosing chamber is reciprocatingly movable therein. This piston forms the adjusting element. Due to the spindle drive, it is possible to adjust steplessly (e.g., smoothly) the volume of the dosing chamber from outside without much effort. Moreover, it is possible to indicate externally the position of the piston by providing a dial on the adjustment wheel, so that highly exact dosing of the preparation with a high repetition rate becomes possible. The dial may indicate a relation between body weight and the preparation dose.

The twisting device also comprises a drive connected in a torque-proof way (or: rotationally fixed), which may be connected with the rotary valve and when twisted causes the rotary valve to twist. In the simplest situation, the drive is formed by an actuator in the form of a twisting wheel, which may be operated manually. It is designed in a shell-like way, whereby the twisting wheel encompasses the rotary valve in the circumferential direction and partially in the axial direction. The twisting wheel may be connected with the rotary valve in a form-fitting and/or frictional way. The rotary valve, twisting device and adjustment device are preferably arranged coaxially in terms of a short design to the axis of rotation and slightly offset relative to one another in the longitudinal direction.

According to an especially advantageous design, the actuator of the adjustment device is formed by the twisting device. In this case, the twisting wheel functions as a portioning wheel, which may assume two functions (or: operations) independent of one another. These are characterized by two operating positions between which, the portioning wheel is slidable in the longitudinal direction slidable. The portioning wheel is axially slidable in the longitudinal direction relative to the adjustment device and the rotary valve. In the first operating position, the adjustment wheel of the adjustment device and the portioning wheel connected with one another in a torque-proof way, whereby the connection is without a torque-proof connection between the portioning wheel and the rotary valve. In the second operating position, the adjustment wheel, the portioning wheel and the rotary valve are connected in a torque-proof way. This affords the advantage, that the twisting motion of the rotary valve is without relative motion of the adjustment wheel or adjusting element relative to it (the rotary valve). The adjustment wheel and thus the adjusting element are more or less fixed in order to twist the dosing chamber.

The individual elements—rotary valve, portioning wheel and adjustment wheel—are preferably secured in the operating positions in axial direction against one another. This securing is a result of firstly, the design and interaction of the elements themselves and, moreover, additional, preferably form-fitting means that fix, at least in both operating positions, the position of the portioning wheel and the adjustment wheel relative to one another in the axial direction. In order to realize the connection, the portioning wheel exhibits, in the simplest situation, a serration oriented in the longitudinal direction on the internal circumference, which serration may be meshed with serration areas complimentary thereto on the adjustment wheel and the rotary valve.

According to a further development, a container containing the pharmaceutical preparation is detachably connected with the dosing device, which container fills the chamber with the preparation. Using a separate container has the advantage, that during storage time, the bulk ware may be packaged absolutely dry in thick packaging means—with dry stoppers, if appropriate—, so that problems caused by moisture may be prevented. Only when cracking open the drug is the dosing device placed on top of the container, so that further stability of the preparation needs only be guaranteed for the consumption period (days to a few weeks). When discontinuing intake, the dosing device may also be replaced with the stopper, thus again obtaining a thick packaging means. Moreover, a stability test for the bulk ware needs only be undertaken with the dosing device for the longest consumption period, i.e., for the lowest dosing. Compatibility with a plurality of container designs may be ensured by means of an adapter.

Frequently, several small-particulate preparations combined with each other are filled in a hard gel capsule, whereby a defined mixing ratio between the preparations resulting from the dosing of the preparations must exist. For such combinations, however, compatibility problems may arise. Thus, only fixed combinations are possible for preparation combinations, i.e., when, for example, preparations A and B of a combination are administered in three dosages, respectively, nine possible fixed combinations come about. For certain preparation combinations, however, only a few possible fixed combinations are desirable, wherefore problems may arise when dosing. In order also to dose several preparations combined with each other, it is proposed with an especially preferred embodiment of the dosing device according to the invention to provide at least one further chamber for receiving a further small-particulate pharmaceutical preparation, from which chamber a partial amount of the further preparation is to be dispensed through the dispensing opening. This makes it possible, corresponding to the number of additional chambers, to dose individually different preparations in one operation and mix them with each other in the right ratio.

Furthermore, it is proposed for this embodiment of the dosing device according to the invention to provide a further dosing unit for the further preparation with a further dosing chamber, which in the filling position is connected with a chamber opening of the further chamber for filling with the further preparation, and which in the dispensing position or an intermediate position of the dosing element is connected with a dispensing opening for dispensing the further preparation or with the dispensing opening for the first preparation. In this case, both dosing units are identically constructed preferably with respect to the angle of twist of the dosing chambers, and the rotary valves are mounted on a common axis of rotation and connected with each other in a torque-proof way. Both rotary valves may also use a common basic element, to which the respective adjusting elements, adjusting and twisting devices of the separate dosing units at the terminal areas are then assigned. In this way, the preparations may be dosed and mixed with one another with one single motion of the dosing units coupled with one another via the rotary valves. Alternatively, it is also conceivable to provide a dosing unit for each chamber that is autarchic (independent) with regard to the twisting motion.

It is furthermore conceivable, for safety reasons, to provide a child-proof lock on the dosing device preventing unintentional actuation, especially of the dosing valve or rotary valve, by children.

As materials for the manufacture of the dosing device according to the invention, preferably a plastic material, which may be used for the manufacture of thin-walled molded parts, is used. Especially plastics that will not release any softening agents or other volatile components are thereby preferred, so that contamination of the drug is avoided. In special cases, it may be useful to use a plastic material that is autoclavable.

This will prevent, among other things, that the preparation contained in the chamber of the dosing device is contaminated from outside, since the dosing device in itself is sealed toward the outside in the filling position.

The use of a dosing device according to the invention for dosing small-particulate pharmaceutical preparations according to any of Claims 1 to 29 is characterized by the use for self-dosage by a user immediately before intake of the preparation.

BRIEF DESCRIPTION OF THE DRAWINGS

The solution according to the invention is explained in the following in reference to the figures. These show particularly the following:

FIG. 1*b* illustrates a sectional view according to FIG. 1*a* in the X-Y-plane;

FIG. 1*c* illustrates a view of the lower surface of the dosing device;

FIG. 7 illustrates a design dosing units connected in parallel.

DETAILED DESCRIPTION OF THE INVENTION

FIGS. 1 and 2 show an especially compact design of a dosing device 1 designed according to the invention for dispensing a defined partial amount of a small-particulate pharmaceutical preparation.

Figure 1A:
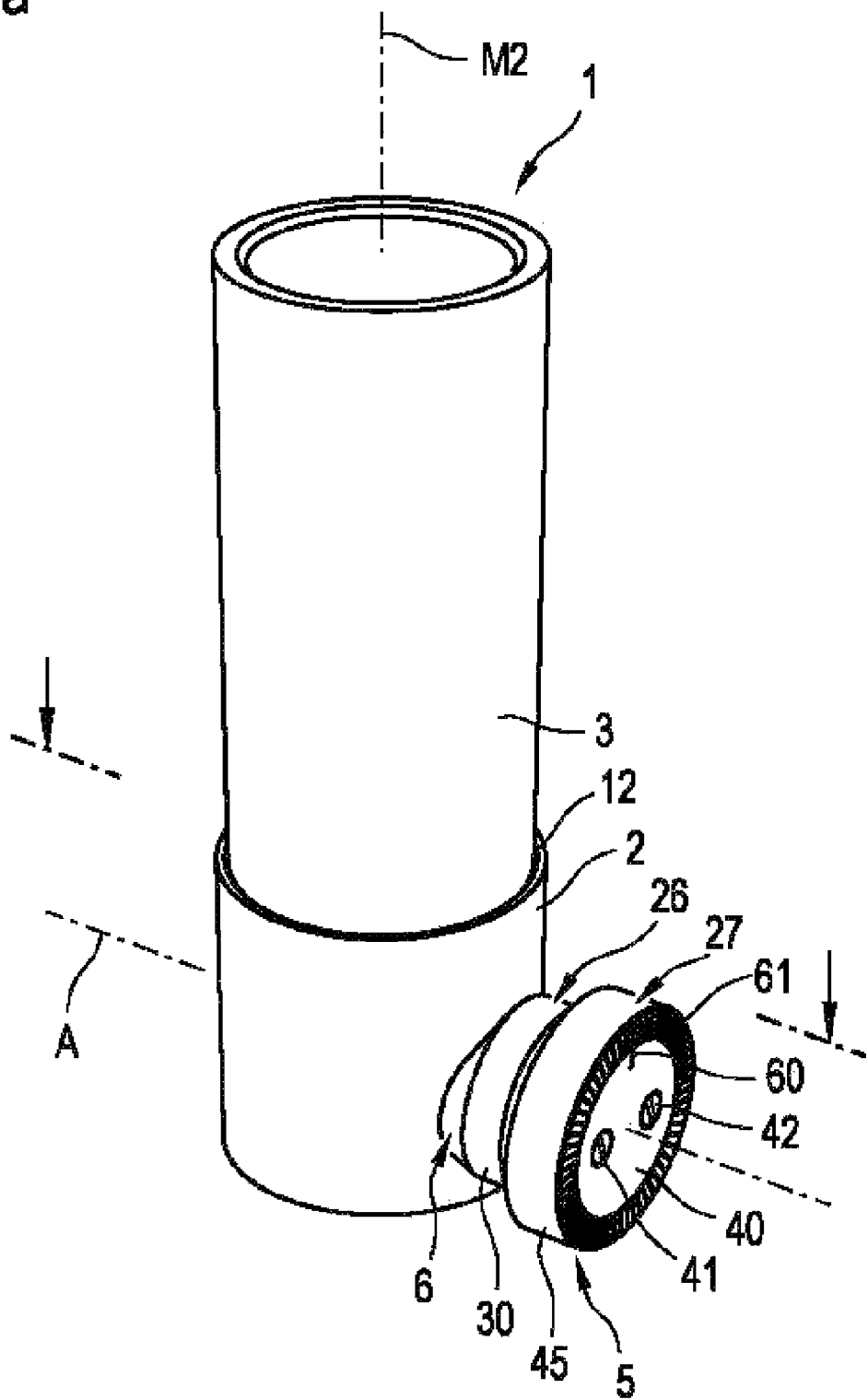
FIG. 1*a* illustrates in a perspective view an especially advantageous design of a dosing device designed according to the invention.
Figure 2A:
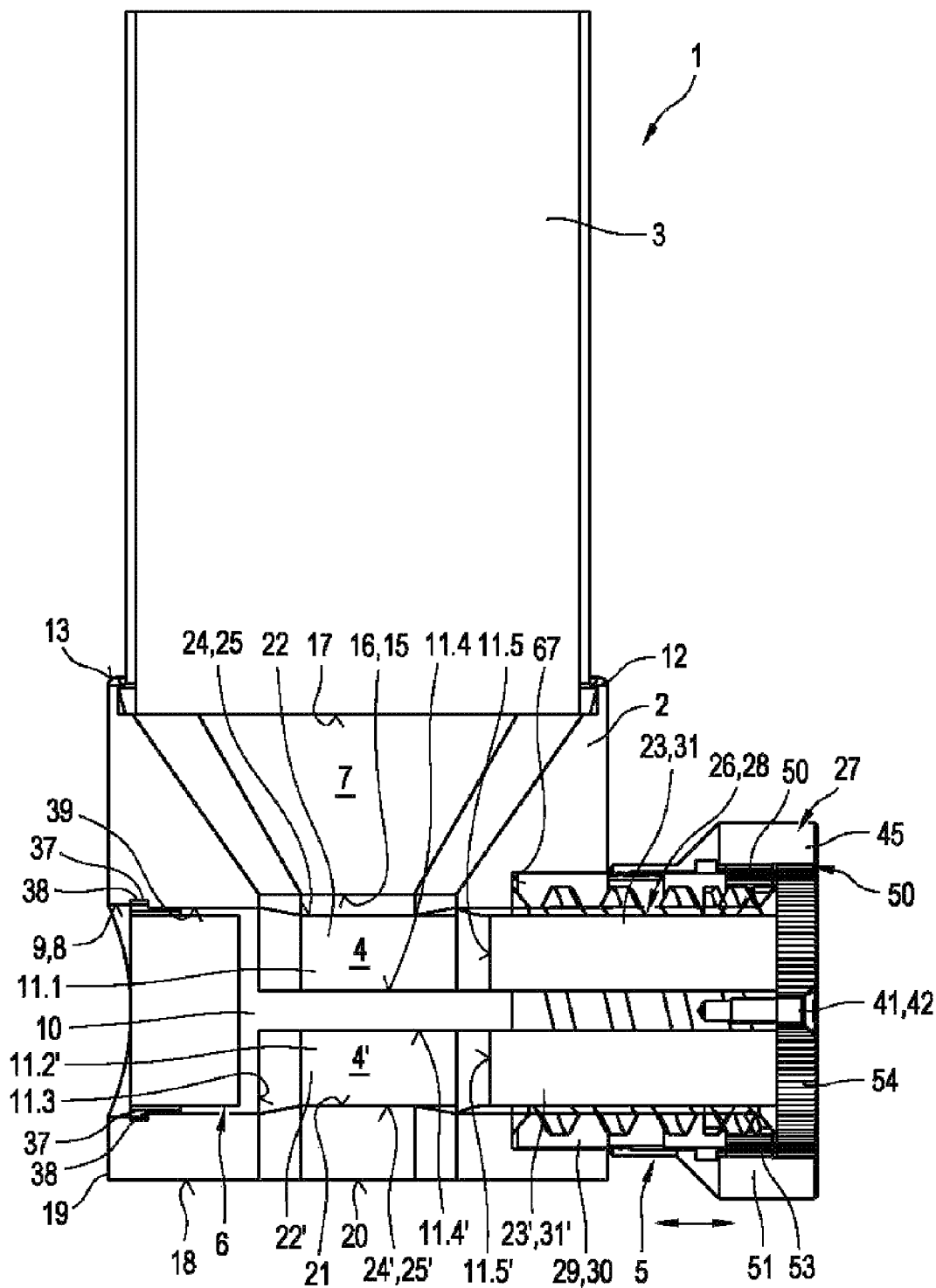
FIG. 2*a* illustrates a dosing device according to FIG. 1 in axial section.
Figure 2B:
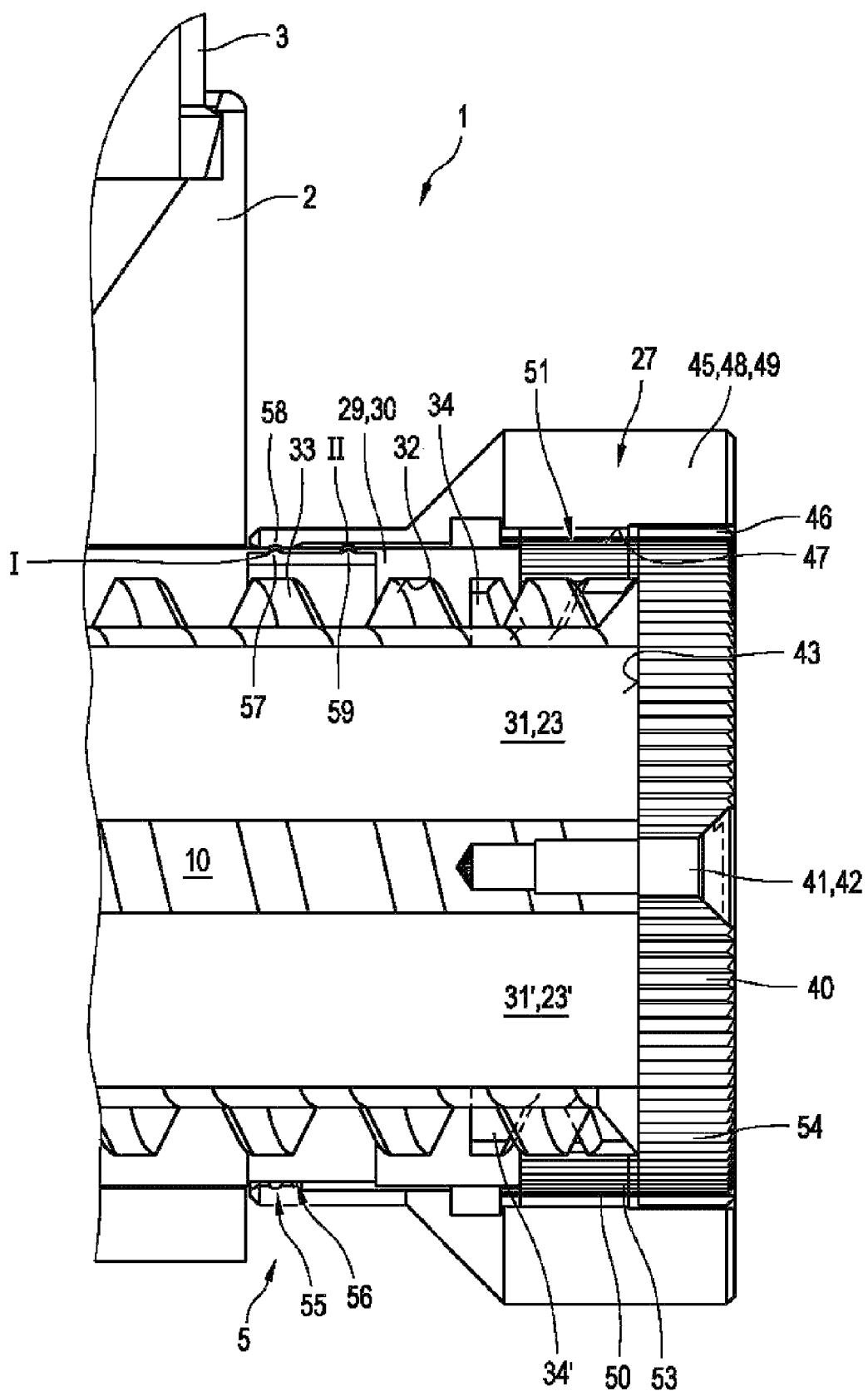
FIG. 2*b* illustrates the detailed design of the adjusting and twisting device based on a section in FIG. 2*a*.

FIG. 1a illustrates based on a perspective view, FIG. 1b based on a sectional view, FIG. 1c based on a (single) view, and FIGS. 2a and 2b based on an axial section the basic structure and the function of this dosing device 1. The upright position, which corresponds to the preferred operational position when handling the dosing device 1, is illustrated. It is characterized by an extension in the direction of height and an extension in the longitudinal direction. The dosing device 1 comprises a base frame 2, which, in the illustrated case, is detachably connectable directly with a container 3, or by inserting an adapter, not illustrated, and a dosing chamber 4 exhibiting at least one dosing unit 5 comprising a rotary valve 6. The rotary valve 6 is rotably mounted about an axis forming the axis of rotation A. In this position of the dosing device 1, the axis of rotation A extends at an angle, preferably perpendicularly to a vertical plane, which is oriented perpendicularly to the axial section plane in FIG. 2. The design according to FIGS. 1 and 2 contains two dosing chambers arranged symmetrically relative to the axis of rotation A. These are designated by 4 and 4'. The individual dosing chamber 4 and 4' is rotably mounted in the base frame 2 between a first operating position corresponding to a filling position, in which it is to be filled with preparation from a chamber 7 arranged in the base frame 2 or the container 3, and a second operating position corresponding to the dispensing position, in which the preparation is to be dispensed from the dosing chamber 4, 4' from the dosing device 1. Thus, the base frame 2 exhibits a guide channel 8, preferably in the form of a passage opening 9, in which the rotary valve 6 is rotably arranged. This base frame extends in the longitudinal direction of the dosing device 1. The rotary valve 6 is thereby preferably secured in the installation position with respect to its position in the longitudinal direction. In the simplest situation, securing is done by form-fitting elements, at the same time allowing twisting in circumferential direction only through the application of a predefined force; preferably securing may also occur through a slot in the base frame 2 and a corresponding nub in the rotary valve 5.

The base frame 2 may be designed differently with respect to the geometry describing the external circumference. In a top view, the base frame is preferably characterized by a cylindrical shape for manual dosing that fits well in the hand. The center axis oriented in the direction of height relative to the upright position is designated by M2. From the upper surface of the base frame 2, a circumferential collar 12 protrudes. Depending on the type of connection required between the container 3 and base frame 2, it may extend parallel or at an angle relative to the center axis M2 of the base frames 2, not shown here. A container 3 for the pharmaceutical preparation with its container opening 17 may be detachably mounted onto the circumferential collar 12.

In the base frame 2, starting from its upper surface, i.e., the front side 13 oriented toward the container 3, a chamber tapering in a funnel-shaped way and symmetrically relative to the center axis M2 of the base frame 2 toward the lower surface 19 of the base frame 2 is designed, which chamber corresponds to chamber 7. The preferably symmetrically tapering chamber 7 changes into a first feed opening 15, which leads to a guide channel 8 for the rotary valve 6 extending perpendicular to the center axis M2 of the base frame 2 or the dosing device 1. Due to the symmetrical construction of chamber 7, the feed opening 15 may extend at a small radial distance to the base frame 2, while still ensuring an even supply of preparation from chamber 7 to dosing chamber 4, 4' in the filling position. In the illustrated case, the feed opening 15 is designed as an elongated hole 16 extending in its longitudinal direction parallel to the longitudinal direction of the guide channel 8, and aligning in the filling position with an inlet opening 24, 24' of the dosing chamber 4, 4'. On the front side 18 of the base frame 2 forming the lower surface 19, a dispensing opening 20 is recessed, which is oriented in the longitudinal direction of the guide channel 8, i.e., extending parallel to the axis of rotation A, and connected with or forming a second feed opening 21 aligning with the dosing chamber 4, 4' in the emptying position, especially the dispensing opening 25, 25' of the dosing chamber 4, 4'. The second feed opening 21 is connected with or forms the dispensing opening 20 of the dosing device 1. It leads into guide channel 8. The first feed opening 15, the second feed opening 21, and the axis of rotation A are parallel to one another, and arranged on top of one another in the direction of height. Both feed openings 15, 21 are thereby preferably arranged without being offset relative to one another in the longitudinal direction. The rotary valve 6 is inserted into guide channel 8 and fixed preferably with respect to its position in the longitudinal direction of channel 8, however, in circumferential direction rotable. The inlet openings 24, 24' and the dispensing openings 25, 25' of the dosing chambers 4, 4' are thereby formed by the same, i.e., a common opening. The inside contour of guide channel 8 is adapted to the shape of the rotary valve 6, at least in the area of the extension of dosing chambers 4, 4' in longitudinal direction, and the required bearing positions. The rotary valve 6 carries the dosing chambers 4, 4' arranged offset relative to one another by 180° and acts at the same time as a blocking element between the feed opening 15 and the feed opening 21 in order to prevent unimpeded and undosed passage of preparations from chamber 7 to the dispensing opening 20. Transfer always occurs through interposition of the dosing chamber 4 or 4'. Rotary valve 6 comprises a basic element 10 forming at least partially the walls 11 of the dosing chamber 5, which element is rotably mounted in the base frame 2.

In the illustrated case, the basic element 10 is symmetrically constructed relative to two planes describable by the axis of rotation A and a perpendicular thereto, respectively, whereby one of the planes coincides with the axial section plane, and forms the wall areas 11.1, 11.2, extending in longitudinal direction, a wall area 11.3, extending in circumferential direction and defining the dosing chamber 4 in axial direction, i.e., longitudinal direction, and a wall area 11.4 of the dosing chamber 4, or analogously, the wall areas 11.1', 11.2', 11.3' and 11.4' of the dosing chamber 4', defining the dosing chamber 4 in the filling position in the vertical direction relative to the second feed opening 21. The surface areas 11.4 and 11.4' oriented in the filling position toward the feed opening 15, i.e., toward chamber 7, also assume the blocking function in order to prevent direct passage of preparations from the feed opening 15 to the dispensing opening 20. In the simplest case, these wall areas are formed through incorporation of corresponding recesses into the basic element 10, especially in the form of grooves 22, 22' extending in longitudinal direction into the basic element 10 of the rotary valve 6 in its longitudinal direction, and extend roughly over the whole length of the rotary valve 6, but is closed in the longitudinal direction, at least at one end. Concerning the design of the rotary valve 6, reference is made to FIGS. 3a and 3b. Rotary valve 6 is thereby inserted such in the guide channel 8, that in the filling position of the individual dosing chambers 4, 4', the groove 22, 22' is connected or aligns at its top side forming the inlet opening 24, 24' of the dosing chamber 4, 4' with feed opening 15. The wall areas 11.5 and 11.5' defining the dosing chambers 4, 4' in axial direction are adjustable and preferably formed by pistons 23, 23' that are slidably accommodated in the grooves 22, 22'. The change of volume of the individual dosing chamber 4, 4' thereby occurs through axial displacement of piston 23, 23' parallel to the axis of rotation A, i.e., in the longitudinal direction of the rotary valves 6. Pistons 23, 23' are guided in grooves 22, 22'. The position of wall areas 11.5, 11.5' determining the volume of the dosing chamber 4,4' is adjusted through a volume adjustment device 26. Twisting of the dosing chambers 4, 4' is done by twisting device 27. In an especially advantageous design, adjustment device 26 and twisting device 27 are arranged coaxially to one another and coaxially to the axis of rotation A by employing common useable elements. In an especially advantageous way, adjustment device 26 comprises a positioning system, which in the simplest case, is in the form of a spindle drive 28, whereby a rotary motion may be converted into a translatory motion. It comprises a drive 29 in the form of an adjustment wheel 30, which with an axially slidable adjusting element 31 that in the illustrated case is designed in the form of pistons 23, 23' and forming wall area 11.5, 11.5', is coupled via a ball thread, or in the illustrated case an acme thread. According to a sectional view through the adjustment wheel 30 in FIG. 4b, it is designed shell-like and encompasses rotary valve 6 in the circumferential direction over a part of its extension in the longitudinal direction. Via its position in the circumferential direction of rotary valve 6, the volume of the dosing chamber 4, 4' is adjusted through coupling with the adjusting elements 31, 31' in the form of pistons 23, 23'. Adjustment wheel 30 assumes the function of the spindle of a spindle drive, which spindle remains unchanged in its position in axial direction, but is twistable relative thereto in the circumferential direction of rotary valve 6, without a torque-proof coupling with the basic element 10 of rotary valve 6, and thus of rotary valve 6 itself. It displays a thread 33 on a partial area forming an internal circumference 32, preferably over the whole internal circumference 32. This thread is designed complementary with respect to design and dimensioning to the pickup elements 34, 34' arranged on the adjusting elements 31, 31'. The pitch of the thread 33 thereby determines the sensitiveness of the setting. If a small pitch is chosen, and thus a plurality of thread courses, twisting the adjustment wheel 30 results in only a minor translatory motion relative to a design with a large pitch at the same angle of twist. In the simplest case, an acme thread is used, which is self-locking. Pickup elements 34, 34' on the adjusting elements 31, 31' in the form of pistons 23, 23', are formed as thread segments designed complementary to thread 33 and extend over a partial area of the aligned surface area extending in the installation position in circumferential direction and originating in radial direction from the axis of rotation A. At least two such pickup elements 34, 34' are preferably provided on an adjusting element 31, 31' for the purpose of secure guidance.

Figure 3A:
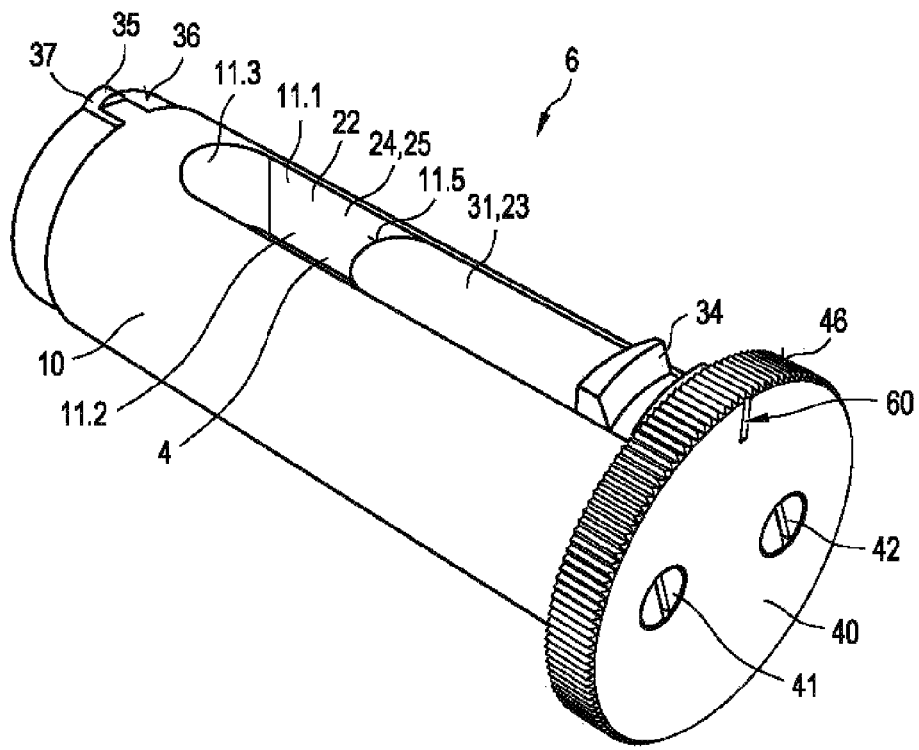
FIG. 3*a* illustrates an adjustment wheel in a sectional view.

This is, for instance, apparent from a perspective view of rotary valve 6 according to FIG. 3a for the adjusting element 34 of dosing chamber 4. Here, the individual thread segment extends over the whole length of the adjusting elements in circumferential direction.

Figure 3B:
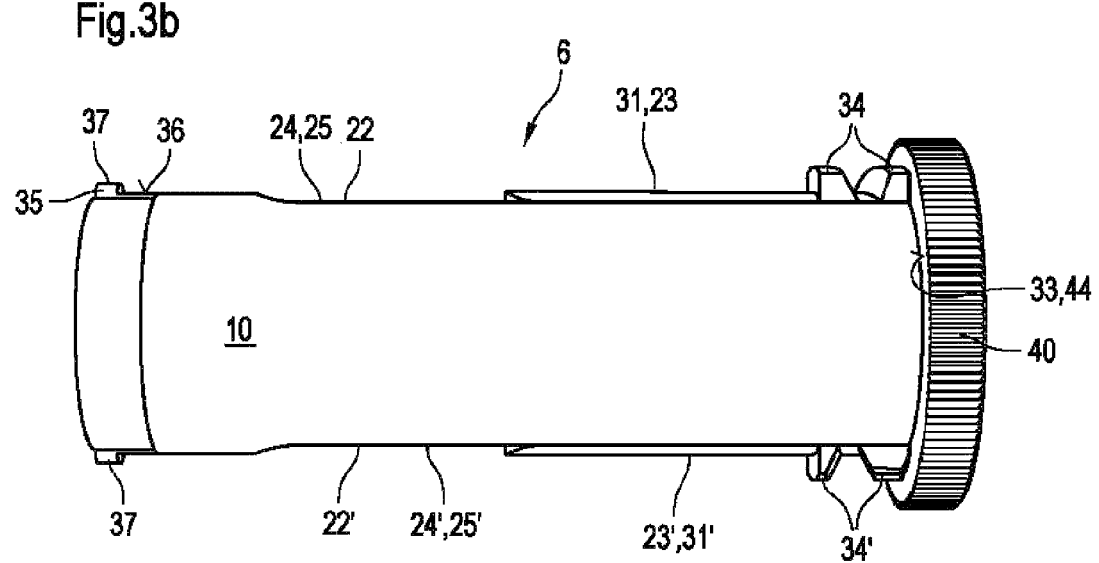
FIG. 3b illustrates a view of the adjustment wheel in longitudinal direction.

FIG. 3b illustrates the rotary valve 6 without surrounding parts in longitudinal direction. Basic element 10, including both adjusting elements 31, 31' and the pickup elements 34, 34' are thereby visible. To be able to set identical volumes with one adjustment procedure for both dosing chambers for a design with two dosing chambers 4, 4' arranged symmetrically with respect to the axis of rotation A of the rotary valve 6, i.e., in the illustrated case offset by 180° relative to one another, it should be observed that the thread segments 34, 34' on both piston elements 23, 23' must be offset by a half turn of the thread, i.e., in this case, effectively half a pitch. The different arrangement of pickup elements 34, 34' in longitudinal direction with identical position of adjusting elements 31, 31 can be seen. This applies analogously for an arrangement of a plurality of dosing chambers grouped in the circumferential direction about the axis of rotation, whereby here, however, corresponding to the arrangement between the individual adjusting elements 31 arranged adjacently in the circumferential direction, the partial thread areas must be positioned correspondingly depending on the angle to one another, i.e., the pickup element 34 must engage with thread 33 on the adjustment wheel 30 in spite of the offset arrangement in the circumferential direction. Basic element 10, especially rotary valve 6, is held in its position in circumferential direction by means of corresponding form-fitting or frictional elements, preferably through latching means, when solely the adjustment procedure for the dosing volume is concerned. In the illustrated case, latching means 35 are designed in the form of projections 37 arranged on the external circumference 36 of the basic element 10 or the rotary valve 6 in the area without adjusting element 34, 34', which projections interact with the corresponding complementary recesses 38 on the internal circumference 39 of the guide channel 8. These are arranged in the area of the dosing chamber plane.

Adjustment wheel 30 is supported in longitudinal direction on base frame 2 of the dosing device 1, e.g., a catch 67 and rotary valve 6, or is fixed in axial direction through these surrounding parts. Rotary valve 6 is therefore for reasons of installation and processing designed at least in two parts in the longitudinal direction. It comprises the basic element 10 connected in a torque-proof way with a cover 40, in the illustrated case, in the form of fastening elements 41, 42 in the form of screws. Cover 40 with front side 43 pointing to the dosing device thereby forms a catch 44 for the adjustment wheel 30 in the longitudinal, i.e., axial direction.

Twisting device 27 comprises a twisting wheel 45. It is connectable in a torque-proof way with rotary valve 6. The connection occurs frictionally or form-fittingly, in the illustrated case, through a spline (or: key serration) 50 oriented in the longitudinal direction and extending in the circumferential direction. It consist of complementarily designed serration elements to be connected with one another on the elements to be connected with one another—twisting wheel 45 and rotary valve 6. Twisting wheel 45 is designed in a shell-like way and in the installation position encompasses adjustment wheel 30 and rotary valve 6 at least partially in longitudinal and circumferential direction. The serration elements are thereby arranged on the external circumference of rotary valve 6, here, the external circumference 46 of cover 40 and the internal circumference 47 of twisting wheel 45. The serration area on the internal circumference 47 of twisting wheel 45, thereby extends over a partial area in the longitudinal direction. In order, on the one hand, to be able to manually operate adjustment wheel 30 and twisting device 27 in a practical way without a very spacious design in the axial direction and. furthermore. ensuring a clear assignment, the twisting wheel 45 acts as a portioning wheel 49 and assumes, besides the function as a twisting actuator. also the function of an actuator 48 for drive 29 of adjustment device 26, especially adjustment wheel 30. Thus, twisting wheel 45 designed as portioning wheel 49 may be placed in at least two operating positions—an initial one (being) characterized by the choice of volume, and in which the portioning wheel 49 is connectable in a torque-proof way with adjustment wheel 30. The connection is created by corresponding frictional and form-fitting elements arranged complementary on both and placeable in engagement with one another. Twisting wheel 45 or portioning wheel 49 and adjustment wheel 30 are thus designed slidable in axial direction relative to one another, whereby connection 51 is created by connection elements that are placeable in active connection. This initial operating position I, which is shown in FIG. 2a and in the detailed representation in FIG. 2b based on FIG. 2a, however, is without a torque-proof connection of twisting wheel 45 or portioning wheel 49 with rotary valve 6. In the second operating position, not illustrated here, twisting of dosing chamber 4, 4' occurs in circumferential direction. Thus, portioning wheel 49 is additionally connected in a torque-proof way with rotary valve 6. The connection occurs through the already reacting spline 50. According to the especially advantageous design in FIGS. 1 and 2, this is at the same time used for a torque-proof coupling between adjustment wheel 30 and twisting wheel 45, or portioning wheel 49. Serration 50 on the internal circumference of twisting wheel 45, or portioning wheel 49, is designed and arranged such, that it exhibits an extension in the longitudinal direction that is greater than the extension of serration 53 complimentary thereto on the external circumference 52 of the adjustment wheel, and moreover, still allows displacement relative to adjustment wheel 30 such, that the connection via this serration 50 with rotary valve 6 is cancelled. Thus, for portioning, i.e., adjustment of the dosing volume, the twisting or portioning wheel is moved in the direction of the dosing device 5 axially relative to the adjustment wheel 30, so that the serration 50 on the internal circumference 47 only interacts with the serration 53 on the external circumference 52 of adjustment wheel 30 complementary thereto. This corresponds to the illustrated first operating position I. If the volume is set and the dosing chamber 4 is located in the filling position, then dosing chamber 4 is filled after the filling of chamber 7. In order to dispense the dosed preparation, rotary valve 6 is now turned. Thus, in order to prevent a change of volume, the adjustment wheel 30 with portioning wheel 45 and rotary valve 6, especially cover 40, is connected in a torque-proof way and the whole rotary valve 6 is twisted by twisting portioning wheel 48. This is done in the second operating position II. Thus, in the illustrated case, the portioning wheel is moved relative to adjustment wheel 30 in axial direction and particularly in the direction away from dosing device 1. In this operating position, serration 50 on the internal circumference 47 of portioning wheel 49 is in engagement with both serration 53 on the external circumference 52 of adjustment wheel 30 and rotary valve 6, especially serration 54 on the external circumference 46 of cover 40. Both operating positions I and II are fixable and adjustable in axial direction through form-fitting or frictional elements, in the illustrated case, through corresponding latching means 55 and 56 in axial direction. These are projections and recesses that may be placed in operative connection with one another on the external circumference 52 of adjustment wheel 30 and on the internal circumference 47 of portioning wheel 49. For operating position I, these are designated by 55, and comprise, in the illustrated case, projections 57 extending over at least a partial area of the external circumference 52 of the adjustment wheel 30 in circumferential direction, which projections interact with recesses 58 extending in circumferential direction, in the illustrated case, a recess 58 on the internal circumference 47 of portioning wheel 49. The same applies to operating position II, which is characterized by displacement of the portioning wheel 49 in axial direction, i.e., in longitudinal direction away from dosing device 1, i.e., in the direction of cover 40. The second operating position is characterized by the engagement of latching means 56. The adjustment path thereby corresponds to the distance a between the latching means 55 of the first operating position I and the latching means 56 of the second operating position II. The latching means 56 thus comprise projections 59 arranged offset to projections 57 on the external circumference 52 in axial direction. These are preferably arranged parallel to the latching means 55 and interact with recess 58 on portioning wheel 49. The adjustment path is thereby chosen such, that the spline 50 on the internal circumference 47 of portioning wheel 49 engages in both serration 53 and serration 54, and under force action, i.e., through manual attack, cancels latch connection 35 of rotary valve 6 in the base frame, and twists the whole dosing unit 5 in circumferential direction, so that the emptying position of the dosing chamber 4 is reached. A volume scale 61 is preferably provided at the portioning wheel 49 or cover 40. Portioning wheel 49, especially scale 61, is thereby located in the neutral position, i.e., with maximal or minimal volume of the dosing chamber likewise in the neutral position for the determined volume. During interaction with the adjustment device 26 due to displacement relative thereto in longitudinal direction and twisting, scale 61 is twisted along with adjustment wheel 30 corresponding to the twisting of portioning wheel 49, and remains in this position during retraction of portioning wheel 49 into the operating position II, whereby this (position) always indicates the portioning volume in cooperation with the indication on cover 40, which has remained in the neutral position. When now twisting between the filling and emptying positions, the scale is also turned, however, remains always recognizable due to the reference identifying at least the neutral position on cover 40, which may be done through a marking 60, independent of whether the twisting motion of rotary valve 6 is continued in the same direction or reversed.

FIG. 1b illustrates a sectional view A-A according to FIG. 1a, FIG. 1b a view of the lower surface 19 of dosing device 1.

Figure 4A:
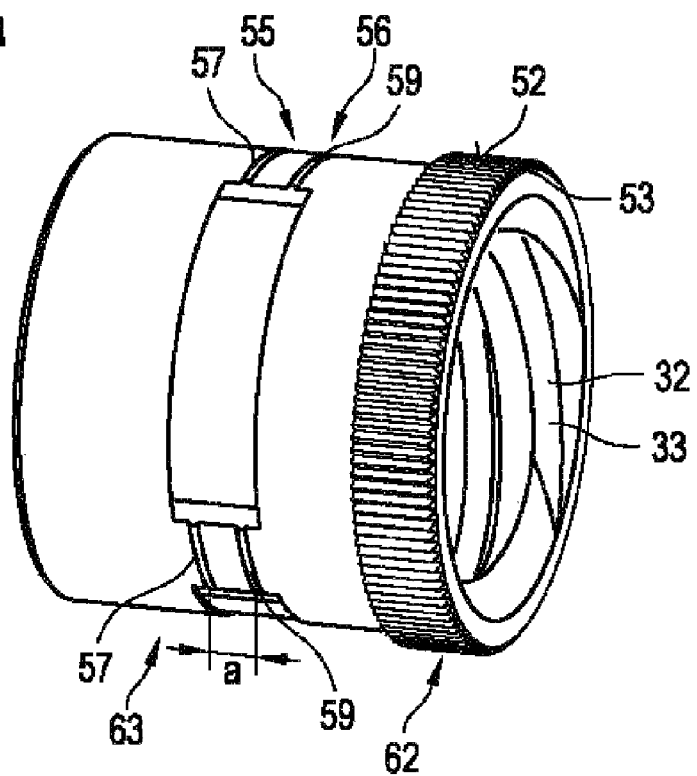
FIGS. 4a and 4b illustrate the rotary valve based on two views.
Figure 4B:
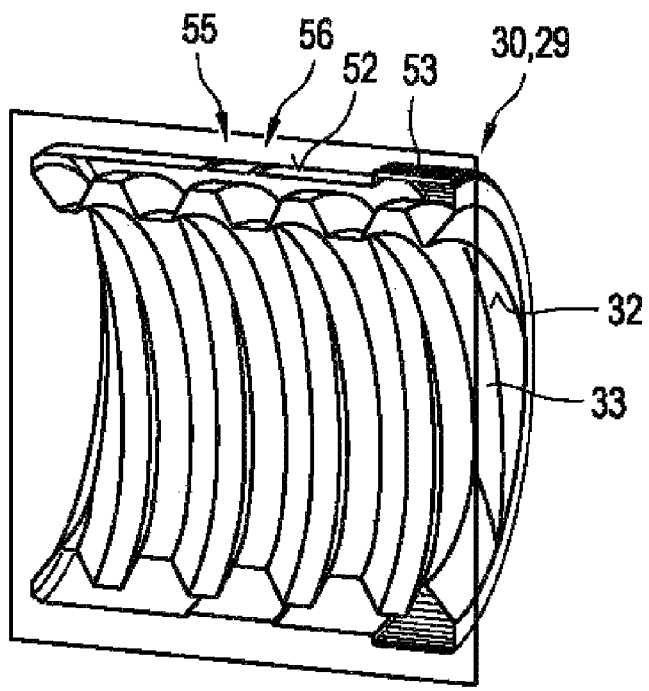
Figure 5:
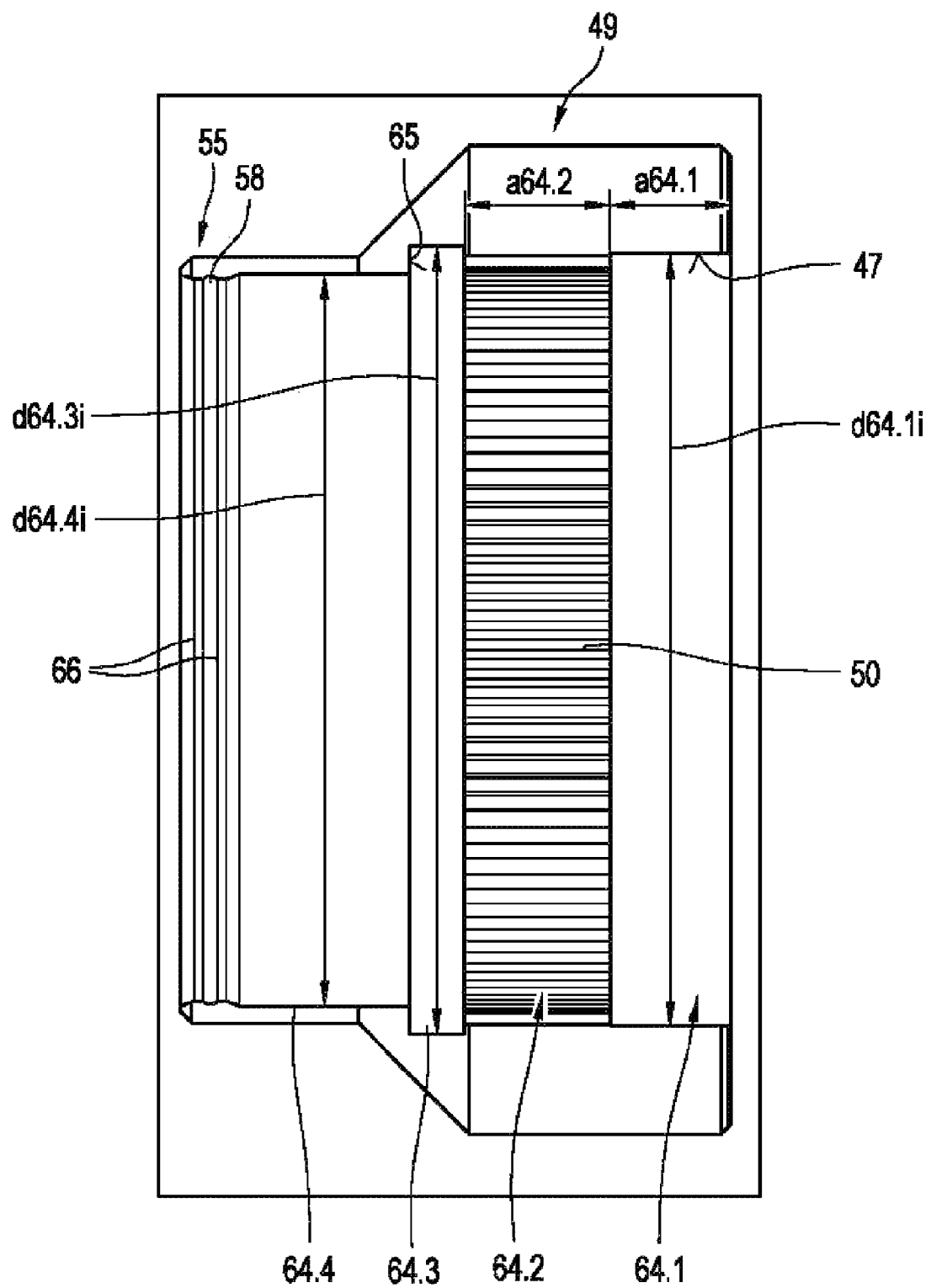
FIG. 5 illustrates the portioning wheel in an axial section.

Reference was already made to FIGS. 3 to 5. Some details are referred to again below. The reference numbers used in FIGS. 1 and 2, were used for the same components.

FIG. 3a illustrates—as already explained—a rotary valve 6 in perspective view. Dosing chamber 4, especially its wall areas 11.1, 11.2, 11.3 and 11.5, formed from the basic element 10 and the piston 23 guided in groove 22 in the form of adjusting element 31. Adjusting element 31 carries the pickup elements 34. Rotary valve 6 designed in at least two parts and besides the basic element 10 comprises the cover 40 connected therewith in a torque-proof way.

FIG. 3b illustrates a view in longitudinal direction of the rotary valve 6, whereby reference is especially made here to the different design of the pickup elements 34, 34' on the adjustment elements 31, 31' arranged offset in circumferential direction, which always need adjustment to the design of the thread 33 on the adjustment wheel 30, especially the pitch or the extension (shape) when offset about the corresponding thread area.

FIGS. 4a and 4b illustrate the adjustment wheel 30 in a view in longitudinal direction and in an axial section. Adjustment wheel 30 exhibits a constant inside diameter over its extension in longitudinal direction, and on which, thread 33 is arranged, preferably over the whole extension in longitudinal direction. On the external circumference 52, adjustment wheel 30 is characterized by at least two different functional areas 62 and 63, whereby functional area 62 serves to realize a torque-proof connection 51 with portioning wheel 49. Thus, in this area on the external circumference 52, a serration 53 complementary to serration 50 on portioning wheel 49 is provided. It extends over the whole external circumference 52 in this area 62 in circumferential direction.

Functional area 63 is characterized by the formation of latching means 55, especially projections 57 and 50, which fix the operating positions of the portioning wheel 49 in axial direction. The latching of the portioning wheel 49 is thereby supported preferably through its elastic shape in the fixing area. Thus, the portioning wheel 49, which is shown in FIG. 5 in an axial section, exhibits different inside diameter areas. A first diameter area 64.1 is characterized by an inside diameter d64.1i, which is the same, preferably larger as the tooth crest diameter of the outside serration on rotary valve 6, especially on cover 40. The axial extension a64.1 is the same or larger as the width of cover 40 in longitudinal direction. The inside diameter d64.2i in the second adjacent area 64.2 is determined by serration 50. It matches the dimensions of the areas carrying the complementary serrations on adjustment wheel 30 and cover 40. The axial extension a64.2 corresponds at least to the displacement path s between operating positions I and II, preferably the sum of the covering (overlapping) or the length of engagement of the serration in the first operating position I and the displacement path s. The third functional area 64.3 forms a catch 65 in axial, which will rest against adjustment wheel 30 and become active preferably in the second operating position II of portioning wheel 49 and prevents the portioning wheel 49 from being pulled out or down from the rotary valve 6. Here, the inside diameter d64.3i is greater than that of the areas 64.1 and 64.2. The fourth functional area 64.4 is characterized by a low wall strength (thickness), so that the inside diameter d64.4i may be chosen preferably corresponding to a loose fit, but also a press or snug fit with the external circumference 52 of the adjustment wheel. Moreover, these areas carry recess 58 extending groove-shaped in circumferential direction on the internal circumference 47 to provide a latch connection, which recess is formed by two beads (or: seams) 66 extending in circumferential direction, arranged parallel to one another and extending to the axis of symmetry. Due to the small strength (thickness) in the area 64.4 and the elasticity caused thereby, these are moveable over the projections 57 and 59 depending on the desired operating position I or II, and still form a press fit, when the projections are accepted into recess 58, with the external circumference of adjustment wheel 30. The serrations on the external circumference 52 in the area 62 of adjustment wheel 30 and on the external circumference 46 of cover 40 are equally dimensioned FIGS. 1 to 5 thereby illustrate an especially advantageous embodiment of a dosing device, 1. Modifications are conceivable.

Figure 6A:
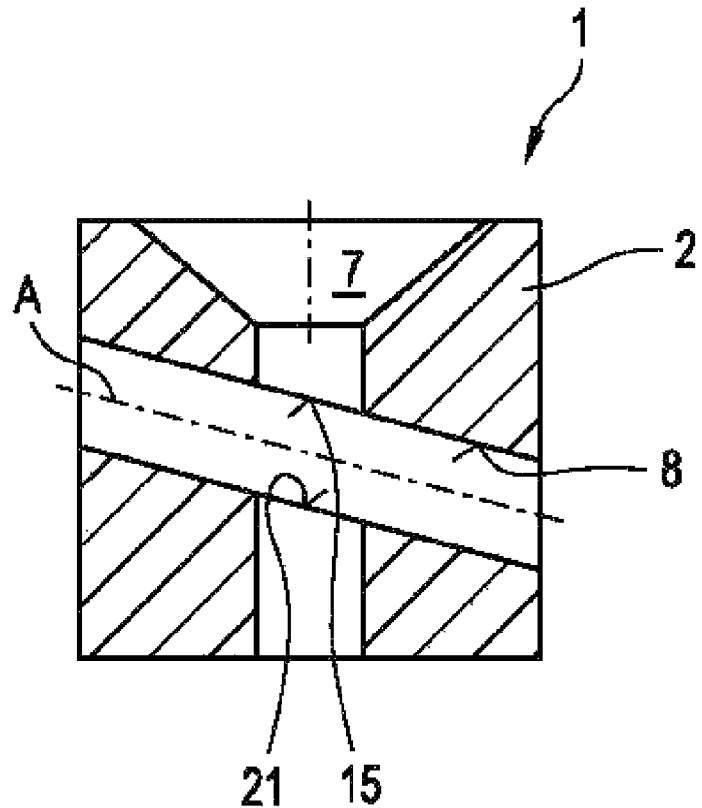
FIGS. 6a and 6b illustrate in a schematically simplified representation of possible arrangements of the axis of rotation.
Figure 6B:
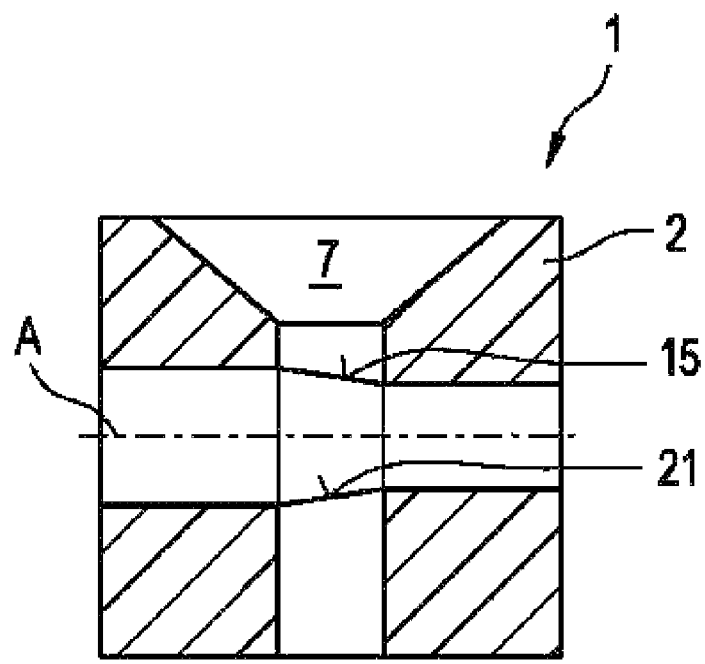

FIGS. 6a and 6b illustrate in a schematically simplified representation optional arrangements of the axis of rotation A generally referred to the feed openings 15 and 21, as well as the direction of height of the dosing device 1 based on axial sections through the base frame 2.

FIG. 6a thereby illustrates a design with parallel arrangement of the axis of rotation A to the axis of the feed openings 15 and 21 describing the extension in longitudinal direction. However, these extend inclined when viewed in the longitudinal direction. The axis of rotation A and therefore also the guide channel 8 are likewise designed inclined in longitudinal direction and inclined relative to the direction of height. The dosing chamber, not shown here, there exhibits a constant cross-sectional shape in the longitudinal direction.

FIG. 6b illustrates a design with horizontal arrangement of the axis of rotation A, i.e., perpendicular to the direction of height and the vertical direction, although inclined relative to the feed openings 15 and 21. The dosing chambers are then characterized by a constantly changing cross-sectional shape in longitudinal direction. This needs to be considering when designing the rotary valve 6.

If FIGS. 1 to 6 are based on individual dosing units, then FIG. 7 illustrates, as an example, a parallel connection of two dosing units 6, 6' in a dosing device 1, comprising two chambers 7, 7' fillable with preparation to be dosed. The dosing device comprises two functional units 68 and 69 connected in parallel and each corresponding with the dispensing opening 20. The basic structure of a functional unit 68, 69 consisting of chamber 7 and dosing unit 6 corresponds to the one described in FIGS. 1 to 6 or the mentioned modifications, which is why especially the construction and realization of the dosing volume adjustment will no longer be discussed. Both functional units, however, are designed identically at least with respect to the angle of twist between the feed openings and the position of the axis of rotation A, A'. Both functional units 68, 69 operate autarkically (independently) relative to the volume adjustment. Only the twisting motion occurs simultaneously due to the torque-proof coupling of both rotary valves 6, 6'. This makes it possible to prepare a compound preparation from different components in one dosing process with a certain mixing ratio. In this embodiment of the dosing device 1 according to the invention, two chambers 7, 7' are designed for two different preparations, so that a combination preparation with individual dosing of the separate components may be done.

Container 3 is preferably made of a plastic material that is easy to process, but may not release any softening agents or other volatile components, in order to prevent contamination of the drug, whereby the plastic material is to be processed, e.g., by injection molding. Moreover, the material should be autoclavable, so that it may be degermed (disinfected), if necessary.

Since the dispenser according to the invention may be refilled with refill packages following application of the entire dose, costs will be saved for long-term therapy, as well, since the costs of separate capsules no longer apply. By choosing thick packaging means, if necessary with drying agents, a considerable improvement of the stability may be obtained.

REFERENCE NUMBER LIST

1 Dosing device
2 Base frame
3 Container
4 Dosing chamber
5 Dosing unit
6 Rotary valve
7 Chamber
8 Guide channel
9 Passage opening 10 Basic element
11 Dosing chamber walls
12 Circumferential collar
13 Front side
14 Chamber
15 Feed opening
16 Elongated slot
17 Container opening
18 Front side
19 Lower surface
20 Dispensing opening
21 Second feed opening
22, 22' Grooves
23, 23' Piston elements
24, 24' Inlet opening
25, 25' Dispensing opening
26 Adjustment device
26 Adjustment device
27 Twisting device
28 Spindle drive
29 Drive
30 Adjustment wheel
31, 31' Adjusting element
32 Internal circumference
33' Thread
34, 34' Pickup elements
35 Latching means
36 External circumference
37 Projection
38 Recess
39 Internal circumference
40 Cover
41, 42 Fastening elements
43 Front side
44 Catch
45 Twisting wheel
46 External circumference of cover
47 Internal circumference of twisting wheel
48 Actuator
49 Portioning wheel
50 Spline
51 Connection
52 External circumference of adjustment wheel
53 Serration
54 Serration
55 Latching means
56 Latching means
57 Projection
58 Recess
59 Projection
60 Identifier
61 Scale
62 Functional area
63 Functional area
64.1-64.4 Functional area
65 Catch
66 Bead
67 Catch
68 Functional unit
69 Functional unit

The invention claimed is:

1. A dosing device for dosing small-particulate pharmaceutical preparations, comprising:
a base including: (i) a first feed opening through which the small-particulate pharmaceutical preparation is sourced, and (ii) a second feed opening through which a dose of the small-particulate pharmaceutical preparation is dispensed, wherein the first and second feed openings are disposed radially about an axis of rotation (A) extending through the base;
a rotary valve assembly being rotatable, by way of user-initiated twisting, within the base frame about the axis of rotation to at least one filling position and at least one dispensing position, the rotary valve including at least one dosing unit having at least one dosing chamber, which includes an inlet/outlet opening disposed along an axis that is transverse to the axis of rotation, wherein:
(i) the inlet/outlet opening aligns with, and receives into the dosing chamber, a defined partial amount of the preparation through the first feed opening of the base when the rotary valve is rotated within the base to the at least one filling position, and
(ii) the inlet/outlet opening aligns with and discharges the defined partial amount of the preparation from the dosing chamber through the second feed opening of the base when the rotary valve is rotated within the base to the at least one dispensing position; and
a dosing adjustment device disposed within the rotary valve assembly and including a longitudinally extending piston having an orientation parallel to, and slidable in a direction parallel to, the axis of rotation, wherein an end face of the piston forms an axially movable wall of the at least one dosing chamber in order to simultaneously adjust: (i) a volume of the at least one dosing chamber, and (ii) a size of the inlet/outlet opening of the dosing chamber, thereby adjusting the defined partial amount of the preparation to be dispensed.

2. A dosing device according to claim 1, wherein the axis of rotation (A) is oriented perpendicularly or at an angle to a direction of height of the dosing device.

3. A dosing device according to claim 1, wherein the axis of rotation (A) is arranged parallel to a longitudinal axis aligned through the first and second feed openings, and the dosing chamber in a direction parallel to the axis of rotation (A) is characterized by a constant cross-section over its extension in such direction.

4. A dosing device according to claim 1, wherein the axis of rotation (A) is arranged inclined relative to the longitudinal axis of the first and second feed openings and the dosing chamber in a direction parallel to the axis of rotation (A) is characterized by a change of cross-section over its extension in such direction.

5. A dosing device according to claim 1, wherein:
the rotary valve is mounted rotably in a circumferential direction in a guide channel in the base of the dosing device;
the dosing chamber is formed by a channel or recess opening at least to one side at the external circumference of the rotary valve, thereby forming the inlet/outlet opening;
the geometry of the guide channel in an installation position in an area of an extension of the dosing chamber in a longitudinal direction thereof is adapted to a cross-sectional shape of the dosing chamber in the longitudinal and circumferential directions, while forming a gap seal between wall areas defining the dosing chamber and adapted to an internal circumference of the guide channel, when turned around the axis of rotation (A).

6. A dosing device according to claim 1, wherein the first and second feed openings are arranged offset relative to one another and at an radial angle in the range of about 20° through 220° about the axis of rotation (A).

7. A dosing device according to claim 1, wherein the first and second feed openings are arranged offset relative to one another and at an radial angle in the range of about 90° through 200° about the axis of rotation (A).

8. A dosing device according to claim 1, further comprising a plurality of individual dosing chambers are provided and paired symmetrically about the axis of rotation (A), whereby the dosing chambers arranged adjacent to one another in the circumferential direction are each arranged at a constant radial angle relative to one another in the circumferential direction of the axis of rotation (A).

9. A dosing device according to claim 8, wherein the radial angle matches an angle of twist between the filling and dispensing positions.

10. A dosing device according to claim 1, wherein respective volumes of the individual dosing chambers are steplessly or stepwise adjustable.

11. A dosing device according to claim 1, wherein the dose adjustment device comprises a spindle drive.

12. A dosing device according to claim 11, wherein the spindle drive is formed by a spindle nut forming an adjustment wheel, whose rotary motion is converted to a translatory motion of the piston.

13. A dosing device according to claim 12, wherein a thread is provided on the adjustment wheel, which threadingly engages pickup elements disposed on the piston.

14. A dosing device according to claim 13, further comprising a plurality of piston elements radially disposed about the axis of rotation and each having a substantially similar configuration, wherein the pickup elements of each piston is arranged offset as a function of a pitch of the threads and a radial angle between the respective pistons.

15. A dosing device according to claim 10, further comprising a twisting device for moving the piston, wherein the twisting device comprises a drive that is combinable with the rotary valve in a torsion-proof way.

16. A dosing device according to claim 15, wherein the drive is formed by a manually operable actuator in the form of a twisting wheel.

17. A dosing device according to claim 15, wherein the rotary valve, twisting device and dosing adjustment device are arranged coaxially relatively to the axis of rotation (A).

18. A dosing device according to claim 16, wherein the twisting wheel is designed as a shell-like element encompassing the rotary valve in circumferential direction and partially in axial direction and being slidable relative thereto in axial direction, and means for realizing a form-fitting and/or frictional connection with the rotary valve.

19. A dosing device according to claim 15, wherein the actuator of the dose adjustment device is formed by the twisting device.

20. A dosing device according to claim 19, wherein:
the twisting wheel of the twisting device is designed as a manually operable portioning wheel;
the portioning wheel is axially slidable in longitudinal direction relative to the dose adjustment device and the rotary valve, whereby the wheel assumes at least two operating positions, a first operating position I and a second operating position II;
in the first operating position I, the adjustment wheel of the dose adjustment device and the portioning wheel are connected in a torque-proof way, whereby the connection is free of a torque-proof connection between the portioning wheel and the rotary valve;
in the second operating position, the adjustment wheel, the portioning wheel, and the rotary valve are connected in a torque-free way.

21. A dosing device according to claim 20, wherein the individual elements—rotary valve, portioning wheel, and adjustment wheel—are secured in the operating positions in axial direction relative to one another.

22. A dosing device according to claim 17, wherein the portioning wheel exhibits a serration on the internal circumference oriented in the longitudinal direction, and that may be meshed with complementary serration areas on the adjustment wheel and the rotary valve.

23. A dosing device according to claim 1, wherein a reservoir containing the pharmaceutical preparation may be detachably fastened on the dosing device directly or via an adapter, which reservoir fills a filling chamber with the preparation, the filling chamber communicating with the first feed opening to source the pharmaceutical preparation.

24. A dosing device according to claim 1, further comprising at least one further dosing chamber for receiving a second small-particulate pharmaceutical preparation, which further dosing chamber is connected with the second feed opening, whereby both dosing units are connected in parallel.

25. A dosing device according to claim 24, wherein both dosing chambers share the common axis of rotation (A), whereby the rotary valves are connected with one another in a torque-proof manner.

26. A dosing device according to claim 1, wherein the dosing device is made of a plastic material and preferably as designed as a molded part, whereby the plastic material is autoclavable.

27. A dosing device according to claim 1, wherein the plastic material is chosen such, that no softening agents or other volatile components are released, in order to avoid drug contamination.

28. A dosing device for dosing small-particulate pharmaceutical preparations according to claim 1, wherein the dose of the pharmaceutical preparation can be adjusted in the range of 40-800 mg or 0.4-8.0 g.

29. A dosing device according to claim 1 wherein:
the dosing unit comprises an adjustment device for setting the volume of the dosing chamber, and
the adjustment device comprises a scale or a dial that indicates a relation between body weight and a preparation dose.

* * * * *